Feb. 26, 1963

R. O. WRIGHT 3,078,834

VERSATILE REMOTE CONTROL SYSTEM FOR
STARTING MOTOR VEHICLES

Filed July 5, 1960

INVENTOR.
REX O. WRIGHT
BY
HIS ATTORNEY

INVENTOR.
REX O. WRIGHT
BY
HIS ATTORNEY

INVENTOR.
REX O. WRIGHT
BY M. Ralph Shaffer
HIS ATTORNEY

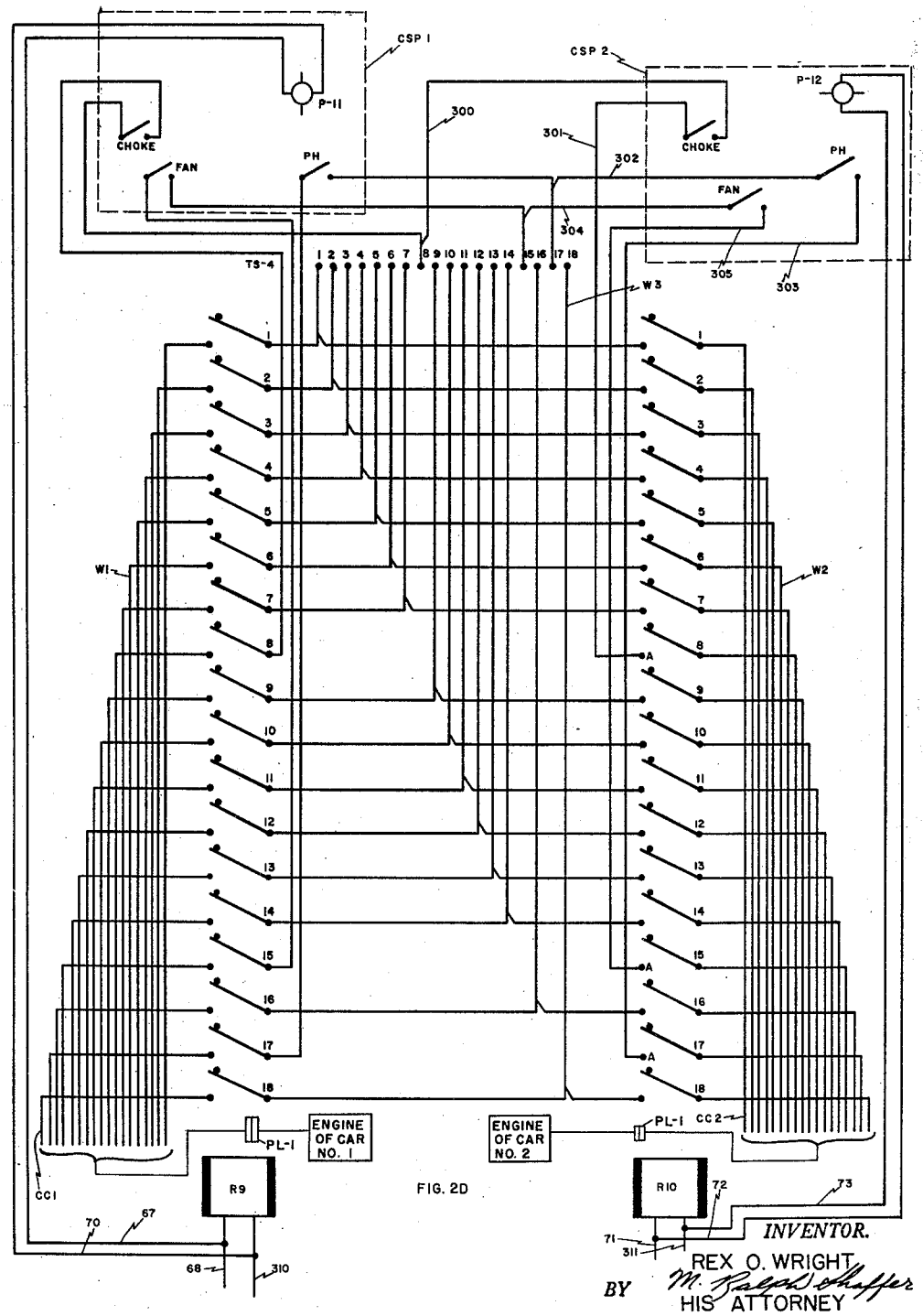

United States Patent Office 3,078,834
Patented Feb. 26, 1963

3,078,834
VERSATILE REMOTE CONTROL SYSTEM FOR STARTING MOTOR VEHICLES
Rex O. Wright, 976 W. 5th S., Salt Lake City, Utah
Filed July 5, 1960, Ser. No. 40,899
2 Claims. (Cl. 123—179)

This invention relates to electrical systems for starting by remote control one or a number of motor vehicles and, more particularly, to a new and improved system of the type described which provides for remote operation, automatic or manual, of a complete series of controls for remotely taking the automobiles or other motor vehicles involved through respective, complete starting cycles under a variety of operating conditions.

Accordingly, an object of the present invention is to provide a new and improved, remote control system for starting motor vehicles.

A further object of the present invention is to provide a remote control electrical system of the type described wherein a complete operation of the entire starting cycle of each motor vehicle connected to the system is provided for, and this under a variety of operating conditions as hereinafter set forth.

The features of the present invention which are believed to be novel are set forth with particularity in the appended claims. The present invention, both as to is organization and manner of operation, together with further objects and advantages thereof, may best be understood by reference to the following description, taken in connection with the accompanying drawings in which:

FIGURE 2C is a schematic diagram of the junction box which is interposed between the FIGURE 2A circuit and the FIGURE 2 circuit.

FIGURE 2D is a schematic diagram of the circuit which is inserted in the junction box circuit of the system when a plurality of cars (the engines of which are illustrated in schematic, block form) are to be operated by the system.

Figure 1:
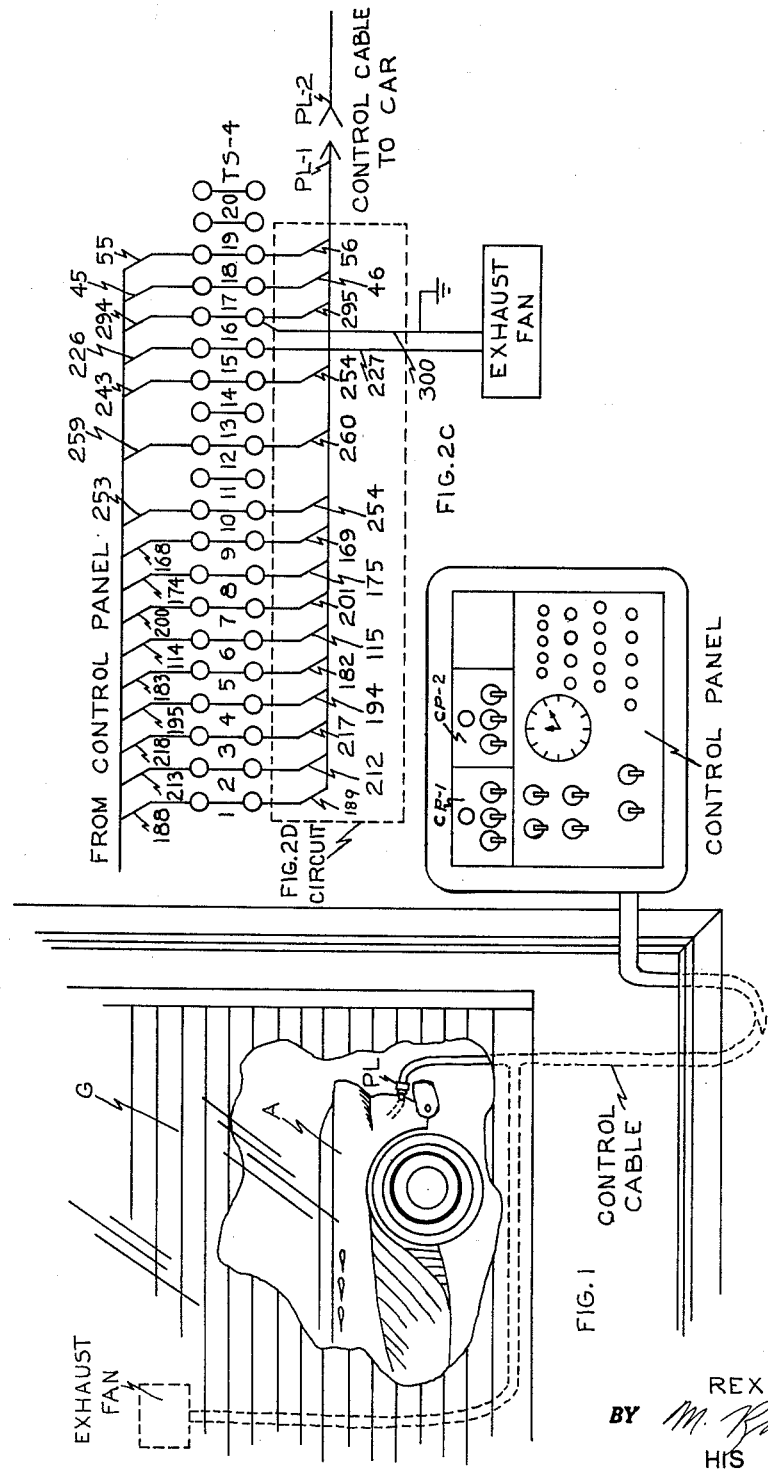
FIGURE 1 is a fragmentary view, partially broken away for purposes of clarity, of the system shown connected from a home or factory, for example, to an automobile in an adjacent garage.

In FIGURE 1 the control panel of the system is shown connected by its control cable to automobile A by means of control cable plug PL. The automobile A is disposed in a garage G whereas the control panel itself may be mounted inside of a residence or factory at RF.

Figure 2:
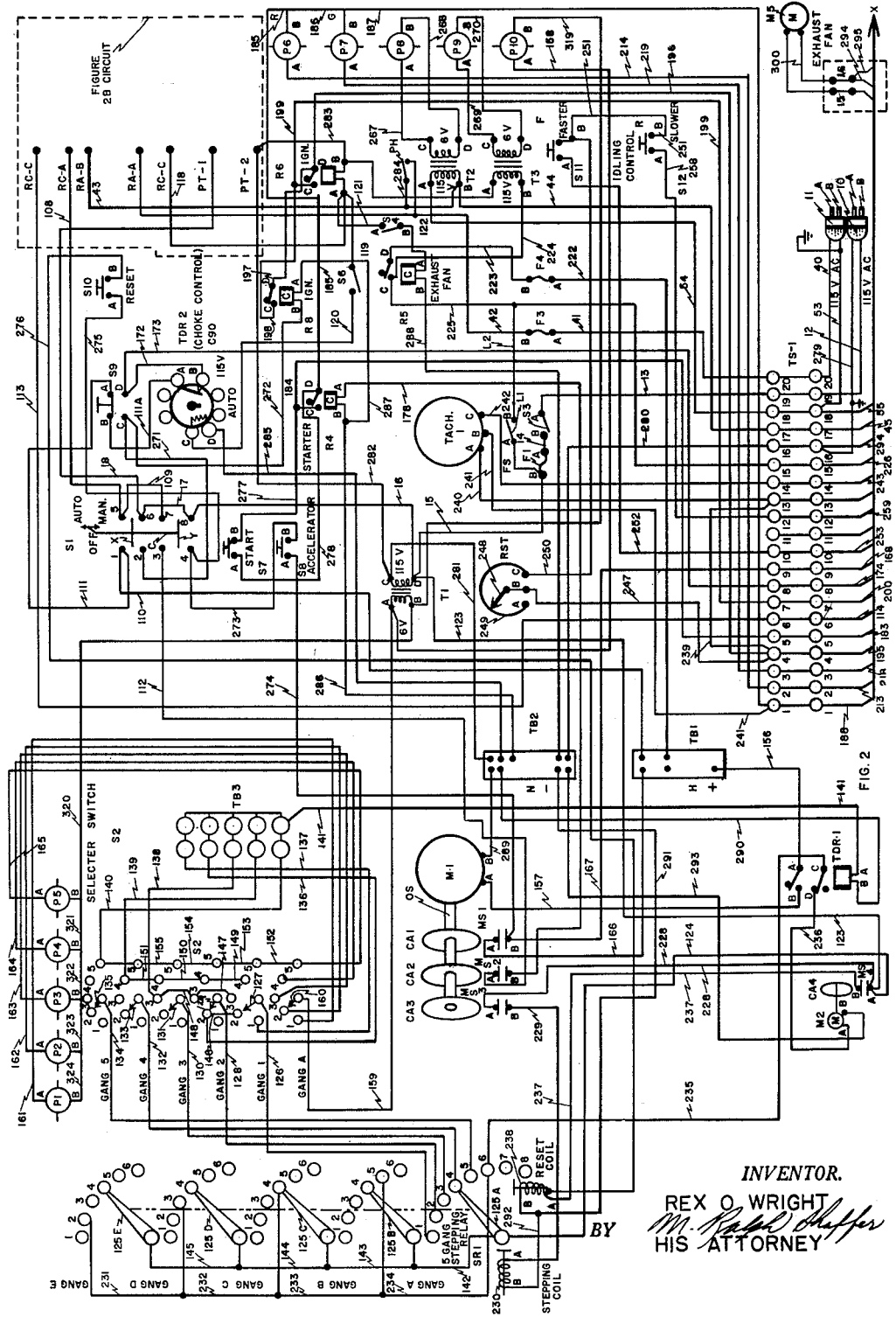
FIGURE 2 is a schematic diagram of the principal portion of the control panel of the system.

At the outset consider that there is but one automobile to be controlled. In this event, the complete schematic of the system will include FIGURE 2 plus FIGURE 2B (complete control panel schematic), the junction box for the control panel as shown in FIGURE 2C, and the schematic in FIGURE 2A relating to the electrical circuit of the motor vehicle itself. The control panel will be considered first, and reference is now made to FIGURES 2 and 2B.

In FIGURE 2 input plug 10 is adapted for coupling to a conventional source of alternating current for supplying power to the over-all system except for the pre-heater circuit, hereinafter described. Input plug 11 supplies power to the pre-heater circuit so as to afford therefor alternating current power in a manner which is independent from the circuit associated with plug 10. Of course a multi-terminal plug could be used instead of two separate plugs. It will be observed that the ground or neutral associated with the circuit of plug 11 will be independent from the ground or neutral of plug 10. The reason for the provision of the independent circuits is to accommodate the increased power requirements of the pre-heaters of the system and also to avoid the dangers of shorting. If the design of the pre-heaters is such as to render the same of low power consumption, then the two circuits may be combined, assuming of course there is no feed back, shorting or other problem. In summary, it may be stated that the auto-starter system of the present invention may be designed for adaption to any situation and condition present.

As seen in FIGURE 2, lead 12 is connected to prong B of plug 10 and to terminal 19 of the terminal strip TS–1. Lead 13 is connected to terminal 19 of terminal strip TS–1 and to terminal A of "on-off" switch S–3. Lead 14 is connected to terminal B of the "on-off" switch S–3 and to terminal A of fuse F–1. Terminal B of fuse F–1 is connected to lead 15, the same running to terminal D of transformer T–1. Lead 16 is connected to terminal D of transformer T–1 and to terminal 8 of switch S–1. Jumper 17 connects terminals 8 and 6 of switch S–1. Lead 18 is connected to terminal 6 of switch S–1 and leads to the junction terminal which is designated as PT–1 as found in the dotted-line box designated as the FIGURE 2B circuit (see FIGURE 2B of the drawings). It will be seen with reference to FIGURE 2B that lead 19 is connected to the terminal PT–1 and leads to terminal A of contact arm 20 of the program timer 25. To this terminal A is connected lead 21 which leads to terminal A of the program timer motor designated as 22. Lead 23 is connected to the contact arm 24 of program timer 25 and also to junction terminal 4. Lead 26 is connected to junction terminal 4 of the program timer and to terminal A of the tube-type time delay relay TDR–3 in FIGURE 2B. Lead 27 is connected to this terminal A of relay TDR–3 and leads to terminal D of relay TDR–3, being a jumper wire. Lead 28 is connected to terminal D of relay TDR–3 and to the contact arm 29 of stepping relay SR–2.

Reverting back now to terminal A of time delay relay TDR–3, it will be seen that there exists another lead which is designated as 30 and which is connected to terminal A of relay TDR–3 and also to terminal A of microswitch MS–7. As is shown, microswitch MS–7 is of the normally closed type switch. Lead 31 is connected to terminal A of microswitch MS–7 and terminal A of cam motor M–4. Lead 32 is connected to terminal A of cam motor M–4 and also to terminal E of relay RB. Lead 33 is a jumper wire and is connected to terminal E of relay RB and also to terminal C of the same relay. Lead 34 is connected to terminal C of relay RB and terminal B of relay RC as shown.

Lead 35 is connected to terminals B and D of relay RC. As is seen, relay RC is a double-pole single throw type relay both sides of which are normally open. Lead 36 is connected to terminal D of relay RB and to winding terminal E of relay RC.

As is shown, prong A of plug 10 is maintained at a ground or neutral potential. Prong B shall be considered as connected to the "hot" side of the circuit. By virtue of that portion of the circuit which has been described thus far, it will be seen that the voltage impressed upon prong B (relative to prong A) of input plug 10 is carried to terminal D of transformer T–1, to terminal 8 of switch S–1, to terminal A of motor 22, through contacts 20 and 24 to terminal A of the normally closed, time delay relay TDR–3, to terminal D thereof, to arms 29 and 66 of stepping relay SR–2, and through microswitch MS–7 (which is normally closed) to the two relays RB and RC.

Figure 2A:
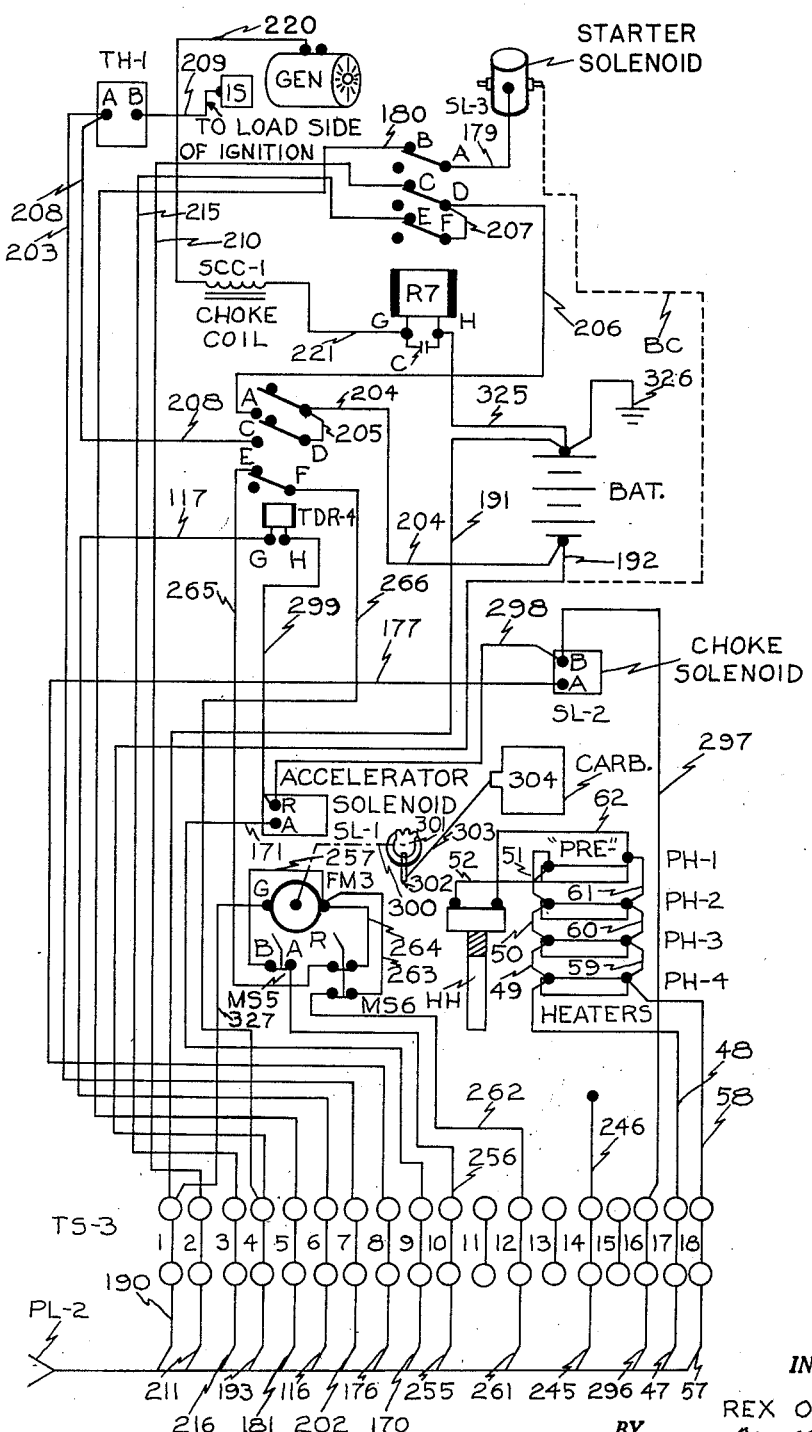
FIGURE 2A is a schematic diagram of that portion of the system which is included in an automobile adapted for connection to the system wherein the internal combustion engine is shown in schematic, fragmentary view, to wit, illustrating the ignition, carburetor, generator, etc., thereof.

Lead 37 is connected to terminal B of microswitch MS-7 and to terminal A of relay RB. Lead 38 is connected to terminal F of relay RB and to terminal A of switch S-5 which is a manually-operated switch. Lead 39 is connected to terminal B of switch S-5 and terminal D of relay RA. Relay RA is now energized and, it being understood that the terminals RA-A and RA-B in FIGURE 2A are identical with the same terminals, respectively, in FIGURE 2B, that lead 40 (connected to prong A of plug 11) will supply power through the contacts of relay RA to energize transformer T-2 (so as to light pilot light P-8 to indicate that the pre-heaters are on) and return via lead 44 through terminal 17 of terminal strip TS-1 to pre-heaters PRE including head bolt heater HH. The remaining side of the pre-heaters (mounted within the automobile engine well) PRE and head bolt heater (mounted in the automobile engine's head or block) HH is maintained at ground potential through terminals 18 back to prong A of plug 10 in FIGURE 2A. The individual pre-heaters of the unit PRE are designated PH-1, PH-2, PH-3, and PH-4, respectively, each having terminals A and B as shown. All of the pre-heaters are connected together in parallel by jumpers 49, 50, 51, 59, 60 and 61 as shown. Leads 52 and 62 shunt the headbolt heater HH across the pre-heaters PRE.

Figure 2B:
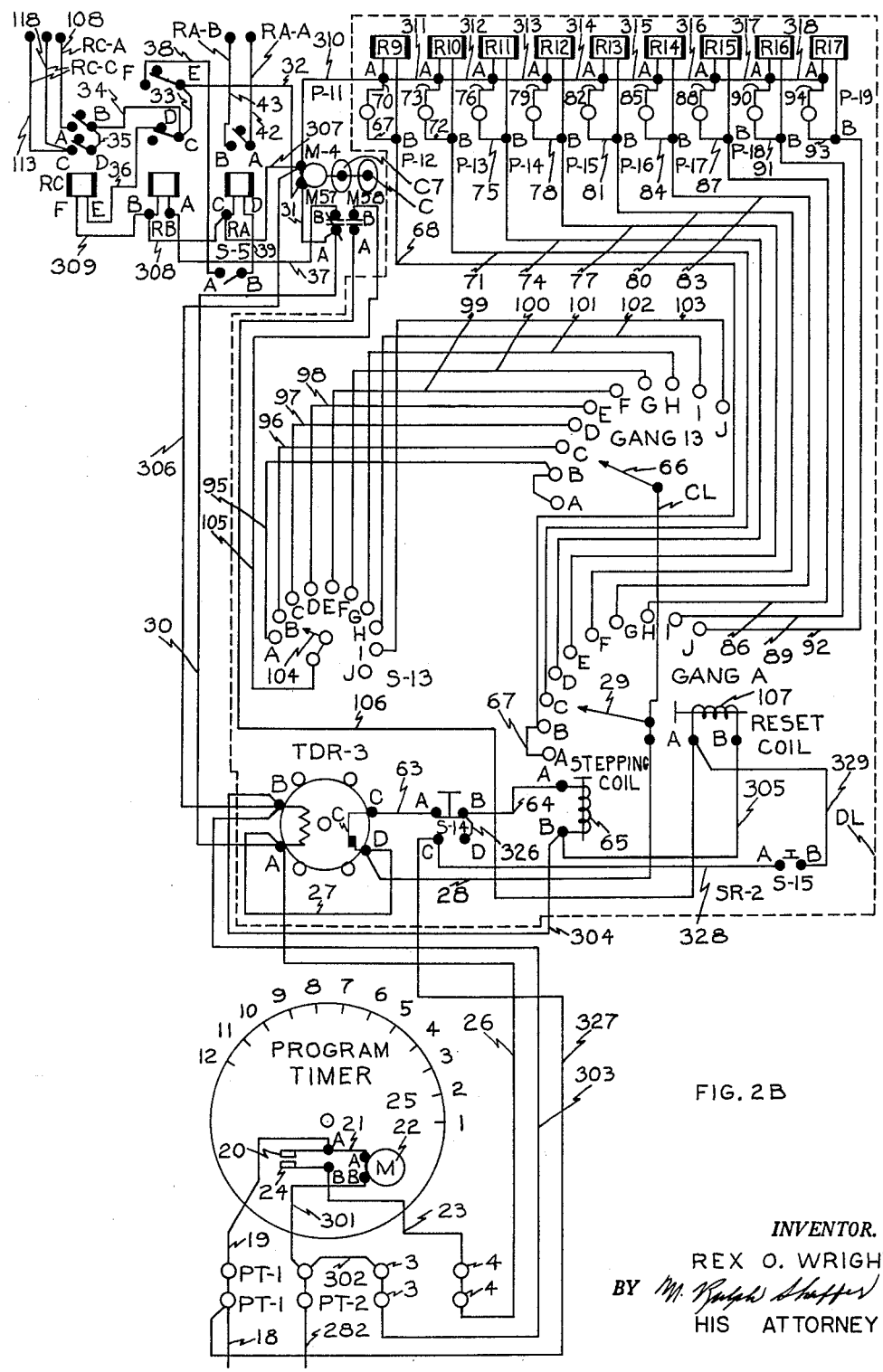
FIGURE 2B is a continuation of the control panel schematic of FIGURE 2.

Lead 63 connects terminal C of the time delay relay TDR-3 to terminal A of switch S-14, the latter being a manually-operated switch on the control panel. Lead 64 is connected to terminal B of switch S-14 and also to terminal A of the stepping coil 65 of stepping relay SR-2. When current flows through the circuit (hereinbefore described), current will also flow through lead 27 to terminal D of relay TDR-3 and through lead 28 to contact arms 29 and 66 of stepping relay SR-2. Current also flows across terminals C and D of time delay relay TDR-3 and through lead 63, switch S-14, and lead 64 to terminal A of the stepping coil of stepping relay SR-2. When the stepping coil is then energized the contact arm of gang A of stepping relay SR-2 and also of gang B of the same relay are stepped from their respective contacts A to their respective contacts B on both gangs; thus, each time the coil 65 of stepping relay SR-2 is energized the arms 29 and 66 of each gang will be stepped up one position. As will be seen, the sole function of the time delay relay TDR-3 is to remove potential across and current through stepping coil 65 during intervals between successive repositionings or "steps" of arms 29 and 66 of the stepping relay SR-2. Thus, current is removed from the stepping coil after each "step" so that a subsequent re-energization and new step may be made possible. As is seen in FIGURE 2B, wire 67 is a jumper connecting to terminals A and B of gang A of stepping relay SR-2. Leads 68, 71, 74, 77, 83, 86, 89 and 92 are respectively connected to terminals B of pilot lights P-11 through P-19, respectively (which are shunted across the respective relays), and also to the coils as shown of relays R-9 through R-17. The remaining sides of each of these relays is connected by lead 310 to terminal B of cam motor M-4. This common lead 310, common to the sides B of the several relays indicated also connects to the remaining sides of pilot lights P-11 through P-19 by respective leads 70, 67, 73, 72, 76, 75, 79, 78, 82, 81, 85, 84, 88, 87, 90, 91, 94 and 93. The circuitry enclosed within dotted line DL will be included in the system only when there is more than one car which is to be controlled. In such event then there must be one relay (R-9, etc.) per car, each being a relay being of a multiple type capable of switching in the circuits associated with terminals 1-18 of strip TS-3.

It should be mentioned at this juncture that the stepping relay SR-2 (both gangs thereof) are employed only if there is more than one car to be controlled by the system. Thus, the terminals B—J of each of the gangs A and B of stepping relay SR-2 correspond to different motor vehicles to be actuated by the system.

If, for example, there is but one car being employed and that this motor vehicle corresponds to position B of stepping relay SR-2. Correspondingly, contact arm 104 will be set at position A of switch S-13 so as to close the circuit of coil 107 of stepping relay SR-2 upon the actuation of microswitch MS-8 by its associated cam C-8. Accordingly, the closing of microswitch MS-8 by cam C-8 will actuate the reset coil so as to step the arms 29 and 66 back to position A after the last car (here, one car) has been started, after which time the reset circuit will be in open condition since the cam motor M-4 will have returned MS-8 to open position. Again, it will be seen with respect to stepping relay SR-2 and, in particular, with respect to reset coil 107 that the circuit of the latter includes coil 107, lead 106, microswitch MS-8, lead 105, switch arm 104 of switch S-13, the selected lead 95, contact arm 66 of gang B of stepping relay SR-2, common lead CL and back through lead 28 to terminal D of the time delay relay tube TDR-3. Lead 305 is simply a neutral wire, whereas lead 28 is supplied a potential difference by being jumpered by lead 27 of terminal D of relay TDR-3 to terminal A thereof which comes from terminal 4 of program timer 25.

Lead 108 is connected to terminal A of relay RC and (see the dotted line in "FIGURE 2B circuit") to terminal 5 of selector switch S-1 in FIGURE 2. Lead 109 is a jumper wire connecting terminals 5 and 7 of switch S-1. (It will be noted that terminals 5 and 7 are on the automatic side of switch S-1.) Lead 110 is connected to terminal 1 on the automatic side of switch S-1 and also be terminal bus TB-1 which is hot. Thus, it is seen that terminal bus TB-1 becomes hot only when program timer 25 exhibits a closed-circuit condition through contacts 20 and 24. Again, this is through lead 12 from prong B of plug 10, through lead 13, switch S-3, fuse F-1 to transformer T-1 and from there via lead 16 through switch S-1, through lead 18 to terminal PT-1 and (referring to FIGURE 2B) through the program timer via contacts 20 and 24, through lead 23 and terminals 4 and lead 26 to terminal A of time delay relay TDR-3, and from this terminal A through lead 30 to switch MS-7, through lead 31 connecting thereto and lead 32 and subsequently through jumper 33 and 34 and, when relay RC is energized, through lead 108 (see the FIGURE 2B circuit dotted enclosure in FIGURE 2) to terminal 5 of switch S-1, through this switch and via lead 110 to terminal bus TB-1 to render the same hot.

Other high voltage circuits are as follows:

It is seen that when the switch S-1 is on automatic a high voltage will be transmitted through this switch to terminal 1 and will be transmitted therefrom via lead 111 through the normally closed side of switch S-9 to contact A (the contact side) of the normally closed time delay relay TDR-2 (which operates with a delay preceding the opening of the relay).

Turning again to switch S-1 it is seen that the high potential present at terminal 5 of S-1 is transmitted through switch S-1 when the same is on automatic position by jumper 109 and lead 112 to terminal A of MS-2. (This voltage potential is also supplied from terminal 3 of switch S-1.)

Jumper 35 connects terminals B and D of relay RC. When relay RC is energized the high potential will be transmitted to lead 113 (see now FIGURE 2A) to terminal 6 of terminal strip TS-1 and from there through lead 117 to time delay relay TDR-4.

Returning again to relay RC it is seen that lead 118 is connected to terminal C of this relay. This lead 118 is seen at RC-C in FIGURE 2A and connects to terminal A of relay R-6 to energize this relay. Lead 119 is connected to terminal A of relay R-6, proceeds through switch S-6, becomes lead 120 which proceeds to terminal C of time delay relay TDR-2 to energize this relay.

Returning again to terminal A of relay R-6 it will be seen that lead 121 connects thereto and through switch S-4 and lead 122 to terminal A of relay R-5 which, as will be seen, operates the exhaust fan. Lead 123 is connected to terminal D of transformer T-1 and to terminal A of microswitch MS-4. From here we go into two circuit paths. Lead 124 connects to terminal A of microswitch MS-4 and to the contact arm 125A of stepping relay SR-1. This makes all of these arms 125A-E hot. Stepping relay SR-1 is a five gang stepping relay as shown. Contact 1 of gang A is connected by lead 126 to contact arm 127 of selector switch S-2. Correspondingly, contacts 2 through 5 of gang A of stepping relay SR-2 routes to the contact arms 129, 131, 133 and 135, respectively, of selector switch S-2. Assume now that contact arm 125A is on position 1 and connects with contact 1 of gang A. (Of course all of the other arms 125B-125E will be in contact with their respective contacts 1.) In this event the circuit will be completed from contact 1 of gang A of SR-1, through lead 126, arm 127, through contact 1 (this is the selector switch which will be at this time set upon position 1 also) through lead 137 to connect to terminal bus TB-3.

Assume now that the selector switch S-2 is set on position 2 as is shown in the drawings. In this event lead 126 is connected to contact 1 of stepping relay SR-1 and is electrically connected through switch arm 127, through contact 2, through jumper 146 to terminal 2 of gang 2 and from there through lead 136 to terminal bus TB-3. Lead 141 is common to these leads by virtue of the terminal bus TB-3, and the former leads to time delay relay TDR-1, energizing the same and starting cam motor M-1 by virtue of electrical connection thereto through lead 157. This motor starting is produced by virtue of the closing of the upper side of the relay so that lead 156 connected to terminal bus TB-1 is in electrical circuit connection with motor M-1 remaining side of which is connected to a neutral bus hereinafter explained.

Lead 158 is connected to terminal A of transformer T-1 and to terminal A of pilot light P-10. Lead 159 is connected to terminal A of transformer T-1 and to the contact arm 160 of gang A of selector switch S-2. Lead 161 connects to contact 1 of gang A of switch S-2 and to terminal A of pilot light P-1. Lead 162 connects to contact 2 of gang A of switch S-2 and to terminal A of pilot light P-2. Correspondingly, lead 163 is connected to contact 3 of gang A of switch S-2 and to terminal A of pilot light P-3. Lead 164 is connected to contact 4 of gang A of switch S-2 and to terminal A of pilot light P-4. Lead 156 is connected to contact 5 of gang A of switch S-2 and to terminal A of pilot light P-5.

Current flows from terminal A of transformer T-1 through lead 158 to terminal A of pilot light P-10. This pilot light indicates that the panel is "hot." (This current is either 6 or 12 volts, preferably.) At this point it should be mentioned that the purpose for the inclusion of transformers T-1, T-2, and T-3 is to enable the employment of pilot lights of similar current rating. Depending upon cost considerations and circuit design, these transformers might conceivably be eliminated. It should be observed at this point that the sole purpose for the inclusion of transformers T-1, T-2 and T-3 is to provide a reduced voltage for pilot lights P-1 through P-5 and P-8 through P-10.

Current flowing from terminal A of transformer T-1 through lead 159, contact arm 160 and one of the leads (161-165) to the corresponding one of the pilot lights (P-1 through P-5) indicates which position selector switch S-2 is set for.

Lead 166 connects to terminal bus TB-1 and to terminal A of microswitch MS-1. Lead 167 is connected to terminal B of microswitch MS-1 and to terminal 9 of terminal strip TS-1. Lead 168 interconnects via terminals 9 of TS-1 and to the leads 167 and 169, the latter via terminals 9 of terminal strip TS-4. Lead 169 is connected to terminal 9 of plug PL-1. Lead 170 connects to the terminal or pin 9 of plug PL-2 and connects to terminal 9 of terminal strip TS-3. Lead 171 is connected to terminal 9 of terminal strip TS-3 and to terminal A of the acceleration solenoid SL-1.

Lead 172 is connected to terminal B (pin #7) of time delay relay TDR-2 and to terminal D of switch S-9, also to terminal 8 of terminal strip TS-1. Lead 174 is connected to terminal 8 of terminal strip TS-1 and also to terminal 8 of terminal strip TS-4. Lead 175 is connected to terminal 8 of terminal strip TS-4 and to the terminal or pin #8 of plug PL-1. Lead 176 is connected to the terminal or pin #8 of plug PL-2 and to terminal 8 of TS-3 and also to terminal A of choke solenoid SL-2.

It will be explained at this point that the solenoids are of conventional design and serve merely to actuate the choke and accelerator of the internal combustion engine of the automobile, being coupled thereto at appropriate carburetor points. When terminal bus TB-1 is "hot," current flows through lead 156 to terminal A of microswitch MS-1. Thus, when cam CA-1 actuates MS-1 the current will flow through lead 167, through terminal 9 of terminal strip TS-1, through lead 168, through terminal 9 of terminal strip TS-4 and lead 169 to the terminal or pin 9 of plug PL-1; also, from terminal or pin 9 of plug PL-2 through lead 170, through terminal 9 of terminal strip TS-3 and lead 171 to the terminal A of the acceleration solenoid SL-1. Lead 172 carries current from terminal B of the normally closed contacts of relay TDR-2, to terminal D of switch S-9, through lead 173 to terminal 8 of terminal strip TS-1, through lead 174, through terminal 8 of terminal strip TS-4 and lead 175 to terminal or pin 8 of plug PL-1; then from terminal or pin 8 of plug PL-2 through lead 176 to terminal 8 of terminal strip TS-3, through lead 177 from TS-3 to terminal A of the choke solenoid SL-2.

Lead 178 connects to terminal B of microswitch MS-2 and to terminal A of the starter relay R-4. Lead 179 is connected to the starter solenoid and to terminal A of relay R-7. Lead 180 is connected to terminal B of relay R-7 and also to terminal 5 of terminal strip TS-3. Lead 181 is connected to terminal 5 of TS-3 and to the terminal or pin #5 of plug PL-2. Lead 182 is connected to terminal or pin 5 of PL-1 and to terminal 5 of terminal strip TS-4. Lead 183 is connected to terminal 5 of TS-4 and also to terminal 5 of terminal strip TS-1. Lead 184 connects to terminal 5 of TS-1 and to terminal C of starter relay R-4.

When starter relay R-4 is energized the circuit is completed to ground or common reference potential through lead 185 which is connected to terminal D of starter relay R-4 and to terminal B of pilot light P-6. Lead 186 connects to terminal B of pilot light P-6 and to terminal B of the pilot light P-7. Lead 187 is connected to terminal B of pilot light P-7 and to terminal 1 of terminal strip TS-1. Lead 188 is connected to terminal 1 of terminal strip TS-1 and also to terminal 1 of terminal strip TS-4. Lead 189 is connected to terminal 1 of terminal strip TS-4 and also to terminal or pin 1 of plug PL-1. Lead 190 is a continuation of lead 189 and is connected to terminal or pin #1 of plug PL-2 and also to terminal 1 of terminal strip TS-3. Lead 191 is connected to terminal 1 of terminal strip TS-3 and to the frame of the car or grounded side of the battery. (A conventional ground connection is shown at 326.)

Lead 192 is connected to the "hot" side of the battery and to terminal 4 of terminal strip TS-4. Lead 193 connects to terminal 4 of TS-3 to the terminal or pin 4 of plug PL-2. Lead 194 connects to terminal or pin 4 of plug PL-1 and to terminal 4 of terminal strip TS-4. Lead 195 connects to terminal 4 of terminal strip TS-4 and to terminal 4 of terminal strip TS-1. Lead 196 connects to terminal 4 of TS-1 and to terminal D of relay R-6. Lead 197 connects to terminal D of relay R-6 and to terminal D of relay R-8. Lead 198 is connected to terminal C of R-8 and to terminal C of relay R-6. Lead 199 is connected to terminal C of relay R-6 and to terminal 7 of terminal strip TS-1. Lead 200 connects to terminal 7 of terminal strip TS-1 and to terminal 7 of terminal strip TS-4. Lead 201 connects to terminal 7 of terminal strip TS-4 and to terminal or pin 7 of plug PL-1 via 201. Lead 202 connects to terminal or pin 7 of plug PL-2 and to terminal 7 of terminal strip TS-3. Lead 203 connects to the terminal 7 of terminal strip TS-3 and to terminal A of thermostat TH-1. It will be seen that thermostat TH-1 is inserted in series with the ignition. Thus, if the engine reaches an unusually high temperature, the thermostat will shut the system off so that the engine becomes inoperative. Lead 204 connects to the "hot" side of the battery and to terminal B of time delay relay TDR-4. Lead 205 connects to terminals B and D of time delay relay TDR-4. Lead 206 is connected to terminal A of TDR-4, and D to terminal of relay R-7, and from thence with jumper 207 to terminal F of relay R-7. Lead 208 connects from terminal C of TDR-4 to terminal A of the thermostat TH-1. Lead 209 connects to terminal B of thermostat TH-1 and to the load side of the ignition switch IS.

The current from the automobile battery illustrated in FIGURE 2A flows through lead 192 to terminal 4 of terminal strip TS-3, and from thence through lead 193, through plugs PL-2, PL-1 and leads 194 and 195 to terminal 4 of terminal strip TS-4. Likewise, current proceeds from terminal strip TS-4 (terminal 4) through lead 196 to terminal D of ignition relay R-6, through lead 197 to terminal D of relay R-8, through its contacts across terminals C and D of R-8, through lead 198 to terminal C of ignition relay R-6. If either relay R-8 or R-6 is energized, the current will flow through the contacts of the particular relay which is energized and back through lead 199, through terminal 7 of terminal strip TS-1, through lead 200, through terminal 7 of terminal strip TS-4, through lead 201, through plugs PL-1 and PL-2, through lead 202, through lead 203 to terminal A of thermostat TH-1. Current also flows through lead 204 from the battery ("hot" side), through lead 204 to terminal B of time delay relay TDR-4, through jumper lead 205 from terminal B to terminal D of relay TDR-4. When TDR-4 is energized, current will flow through contacts A and B and contacts C and D thereof, through lead 208 to thermostat TH-1, also through lead 206 to terminal D of relay R-7 and through jumper wire 207 from terminal D to terminal F of R-7. The ignition is completed through lead 209 from the thermostat TH-1 to the load side of the ignition switch IS.

Lead 210 is connected to terminal C of relay R-7 and to terminal 2 of terminal strip TS-3. Lead 211 is connected to terminal 2 of terminal strip TS-3 and also to the corresponding terminal pin of plug PL-2. Lead 212 is connected from this terminal pin of plug PL-1 to terminal 2 of terminal strip TS-4. Lead 213 is connected to terminal 2 of TS-4 and to terminal 2 of TS-1. Lead 214 is connected from terminal 2 of TS-1 to terminal A of the pilot light P-6. Lead 215 is connected to terminal E of relay R-7 and to terminal 3 of TS-3. Lead 216 is connected to terminal 3 of TS-3 and to the corresponding terminal of plug PL-2. Lead 217 is connected to the corresponding terminal of plug PL-1 and to terminal 3 of terminal strip TS-4. Lead 218 is connected to terminal 3 of TS-4 and also to terminal 3 of terminal strip TS-1. Lead 219 is connected to terminal 3 of terminal strip TS-1 and also to terminal A of pilot light P-7. Lead 220 is connected to the output of the generator (GEN) and connects to terminal A of choke coil SCC-1. The purpose for the inclusion of choke coil SCC-1 is to help maintain a constant potential from the generator to the coil of relay R-7. Lead 221 is connected to terminal B of the choke coil SCC-1 and to terminal G of the coil of relay R-7, this coil being shunted by filter capacitor C.

When the panel is "hot" and ready to operate, time delay relay TDR-4 will have been energized, and current flows through contacts A and B of time delay relay TDR-4 to terminals D and F of relay R-7. Current is flowing through the contacts across terminals C and D of R-7, through lead 210, through terminal 2 of TS-3, lead 211 through plugs PL-2 and PL-1, through lead 212 and terminal 2 of terminal strip TS-4, through lead 213, through terminal 2 of TS-1 and lead 214 to terminal A of pilot light P-6, indicating that the engine is not running. (When the starter relay is energized through cam CA-2 and microswitch MS-2, the winding of the starter solenoid is grounded through terminals A and B of relay R-7 and the contacts (shown connected) across terminals C and D of relay R-4.)

Lead 222 is connected to the terminal bus TB-1 and to terminal A of fuse F-4. Lead 223 is connected to terminal B of fuse F-4 and also to terminal D of relay R-5. Lead 224 connects to terminal C of R-5 and to terminal B of transformer T-3. Lead 225 connects to terminal C of relay R-5 and to terminal 15 of terminal strip TS-1. Lead 226 connects to terminal 15 of terminal strip TS-1 and also to terminal 15 of terminal strip TS-4. Lead 227 connects to this terminal 15 and proceeds to connect to the exhaust fan mounted in the garage, isnce the exhaust fan connects to terminals 15 and 16 of terminal strip TS-4.

Current is picked up at terminal bus TB-1 and flows through lead 222, through fuse F-4, and through lead 223, through the contacts across C and D of relay R-5 (when energized), through lead 224 to terminal B of transformer T-3. Returning now to terminal C of relay R-5 it it seen that another lead (225) carries current to terminal 15 of TS-1. The current then flows to lead 226 from TS-1 and to terminal 15 of TS-4. Lead 227 represents the "hot" lead to the fan motor.

Lead 228 is connected to terminal A of micro-switch MS-4, and to terminal A of micro-swtich MS-3. Lead 229 is connected to terminal B of MS-3 and to terminal A of the stepping coil 230. Lead 231 is a jumper wire that connects to contact #2 of gang E of the stepping relay SR-1 and also to contact #3 on gang D of SR-1. Lead 232 connects to contact 3 on gang D and to contact #4 on gang C of stepping relay RS-1. Lead 233 connects to contact 4 on gang C and to contact 5 on gang B of SR-1. Lead 234 connects to contact 5 on gang B and to contact 6 on gang A of SR-1. Lead 235 connects to contact 6 on gang A and also to terminal B of the time delay relay TDR-1. Lead 236 connects to terminal D of TDR-1 and to terminal A of cam motor M-2. Lead 237 connects to terminal A of the reset coil of SR-1 and also connects to terminal B of the microswitch MS-4.

Lead 239 connects to terminal 4 of terminal strip TS-1 and also to terminal 13 of TS-1. Lead 240 connects to terminal 13 of TS-1 (the same terminal as connected to lead 239) and also connects to terminal A of the tachometer (tach-1). Lead 241 connects to terminal B of tach-1 and also to terminal 1 of TS-1. (Lead 241 constitutes the ground wire for the tachometer tach-1.) Lead 242 connects to terminal C of tach-1 and to terminal 14 of terminal strip TS-1. Lead 243 connects to terminal 14 of TS-1 and also to terminal 14 of TS-4. Lead 244 connects to terminal 14 of TS-4 and to the associated terminal pin 14 of plug PL-1. Lead 245 connects to terminal pin 14 of plug PL-2 and to terminal 14 of TS-3. Lead 246 connects to terminal 14 of TS-3 and to the automobile's distributor breaker points (indicated but not shown).

The tachometer (tach-1) receives its power from terminal 4 of TS-1 through lead 239 and lead 240. Lead 241 is the ground for the tachometer and is connected to terminal 1 of TS–1. Lead 242, lead 243, lead 244, and leads 245 and 246 supply the pulsing current from the breaker points of the distributor of the car to the tachometer.

Lead 247 connects to terminal 4 of TS–1 and to terminal B of the rheostat contact arm 248. Lead 250 connects to terminal C of resistance winding 249 of rheostat RC and connects to terminal B of switch S–11. Lead 251 connects to terminal B of S–11 and to terminal B of switch S–12. Lead 252 connects to terminal A of S–11 and to terminal 10 of TS–1. Lead 253 connects to terminal 10 of TS–1 and also to terminal 10 of TS–4. Lead 254 connects to terminal 10 of RS–4 and to the related terminal or pin of plug PL–1. Lead 255 connects to the corresponding terminal of plug PL–2 and to terminal 10 of TS–3. Lead 256 connects to terminal 10 of terminal strip TS–3 and to terminal A of microswitch MS–5. Lead 257 connects to terminal B of MS–5 and to terminal F of the motor M–3. Lead 258 connects to terminal A of S–12 of push-button switch S–12 and to terminal 12 of terminal strip TS–1. Lead 259 connects to terminal 12 of TS–1 and to terminal 12 of terminal strip TS–4. Lead 260 connects to terminal 2 of TS–4 and to the associated terminal or pin of plug PL–1. Lead 261 connects to the corresponding pin 12 of PL–2 and to terminal 12 of TS–3. Lead 262 connects to terminal 12 of TS–3 and to terminal A of microswitch MS–6. Lead 263 connects to terminal B of microswitch MS–6 and to terminal R of motor M–3. Lead 264 connects to terminal R of M–3 and to terminal D of microswitch MS–6. Lead 265 connects to terminal C of microswitch MS–6 and to terminal E of the time delay relay TDR–4. Lead 266 is connected to terminal F of TDR–4 and to terminal 4 of terminal strip TS–3.

Lead 267 is connected to terminal C of transformer T–2 and to terminal A of pilot light P–8. Lead 268 is connected to terminal B of P–8 and to terminal D of transformer T–2. When the transformer is energized, the pilot light P–8 will come on. P–8 indicates when the pre-heaters PH–1 through PH–4 are on. (Head bolt heater H–8 is also in this latter circuit.)

Lead 269 connects to terminal C of transformer T–3 and to terminal A of pilot light P–9. Lead 270 is connected to terminal B of P–9 and also to terminal D of transformer T–3. P–9 indicates when the exhaust fan is on, and will come on when transformer T–3 is energized.

Lead 271 is connected to terminal 2 of the selector switch S–1 and to terminal C of S–9. Lead 272 is connected to terminal C of switch S–9 and to terminal B of relay R–8. Lead 273 is connected to terminal 4 of switch S–1 and to terminal B of switch S–8. Lead 274 is connected to terminal A of S–8 and to terminal B of microswitch MS–1. Lead 275 is connected to terminal 4 of S–1 and to terminal A of switch S–10. Lead 276 is connected to terminal B of S–10 and to terminal A of the reset coil 238 of stepping relay SR–1. Lead 277 connects to terminal C of relay R–4 and to terminal B of switch S–7. Lead 278 is connected to terminal A of S–7 and D of relay R–4.

It should be noted at this point that when switch S–9 is pressed, closing the contacts across terminals C and D, the contacts across terminals A and B are broken. This is to prevent a feed back through lead 172 which would otherwise start the automatic circuits. (The return path for feedback would include terminals A and B of S–9 and lead 111—to terminal 1 of switch S–1.)

Lead 279 connects to prong A of plug 10 and to terminal 16 of terminal strip TS–1. Lead 280 is connected to terminal 16 of terminal strip TS–1 and to the terminal bus TB–2 which, like TB–1, is a copper bus drilled and tapped for several screw terminals, this to connect the several leads in common to one lead, i.e. 280. Lead 281 is connected to terminal bus TB–2 and to terminal C of transformer T–1. Lead 282 is connected to terminal C of transformer T–1 and to terminal PT–2 of the program timer PT. Lead 283 is connected to terminal PT–2 and to terminal B of relay R–6. Lead 284 is connected to terminal B of relay R–6 and to terminal A of transformer T–3. Lead 285 connects to terminal bus TB–2 and to terminal D (or pin 2) of time delay relay tube TDR–2. Lead 286 is connected to terminal bus TB–2 and to terminal B of relay R–4. Lead 287 is connected to terminal B of R–4 and to terminal A of relay R–8. Lead 288 is connected to terminal bus TB–2 and to terminal B of relay R–5. Lead 289 is connected to TB–2 and to cam motor M–1 at terminal B. Lead 290 is connected to terminal bus TB–2 and to terminal B of time delay relay TDR–1. Lead 291 is connected to terminal bus TB–2 and to terminal B of the reset coil 238. Lead 292 is connected to terminal B of the reset coil 238 and to terminal B of stepping coil 230 of stepping relay SR–1. Lead 293 is connected to terminal bus TB–2 and to terminal B of cam motor M–2. Lead 294 is connected to terminal 16 of terminal strip TS–1 and to terminal 16 of terminal strip TS–4. Lead 295 connects to terminal 16 of terminal strip TS–4 and to the associated terminal of plug PL–1. Lead 296 connects to related terminal of PL–2 and to terminal 16 of TS–3. Lead 297 is connected to terminal 16 of terminal strip TS–3 and to terminal B of the choke solenoid SL–2. Lead 298 is connected to terminal B of the choke solenoid SL–2 and to terminal B of the accelerator solenoid SL–1. Lead 299 is connected to terminal B of the accelerator's solenoid SL–1 and to terminal H of the time delay relay TDR–4. Lead 300 represents a neutral to the exhaust fan and connects to terminal 16 of TS–4.

Going back to terminal PT–2 of the program timer: lead 301 connects to terminal PT–2 and to terminal B of the timer motor 22. Lead 302 is a jumper wire between PT–2 and terminal 3 of the program timer. Lead 303 connects to terminal 3 of program timer 25 and terminal B of time delay relay TDR–3. Lead 304 is connected to terminal B of TDR–3 and to terminal B of stepping coil 65 of stepping relay SR–2. Lead 305 is connected to terminal B of the stepping coil 65 and to terminal B of the reset coil 107. Lead 306 is connected to terminal B of TDR–3 and to terminal B of cam motor M–4. Lead 307 is connected to terminal B of M–4 and to terminal C of relay RA. Lead 308 connects to terminal C of relay R–A and to terminal B of relay RB. Lead 309 is connected to terminal B of relay R–B and to terminal F of relay RC. Lead 310 is connected to terminal B of motor M–4 and to terminal A of relay R–9. Lead 311 connects from terminal A of relay R–9 to terminal A of relay R–10. Lead 312 connects to terminal A of relay R–10 to terminal A of relay R–11. Lead 313 is connected from terminal A of R–11 to terminal A of relay R–12. Lead 314 is connected from terminal A of relay R–12 to terminal A of relay R–13. Lead 315 is connected from terminal A of relay R–13 to terminal A of relay R–14. Lead 316 is connected to terminal A of relay R–14 to terminal A of relay R–15. Lead 317 is connected to terminal A of relay R–15 to terminal A of relay R–16. Lead 318 is connected from terminal A of relay R–16 to terminal A of relay R–17.

The preceding indicates all of the neutral leads to the several parts of the automatic starter circuit.

The following circuit comprises the low voltage neutral circuit of the system. Lead 319 is connected to terminal B of the transformer T–1 and to terminal B of light P–10. Lead 320 is connected to terminal B of transformer T–1 and to terminal B of pilot light P–5. Leads 321, 322, 323 and 324 are jumper wires connected from terminal B to terminal B of the respective pilot lights P–1, P–2, P–3, P–4 and P–5. Lead 327 is connected to terminal G of motor M–3 and to terminal 1 of terminal strip TS–3. This serves as a ground for motor M–3. Lead 325 is connected to terminal H of relay R–7 and to the ground of the side of the battery or frame of the car as indicated by lead 326. Capacitor C is placed across coil R–7 to help smooth the ripple of the D.C. current. Leads 328 and 329 connect switches S–14 and S–15 as shown.

When the operator sets the system to manual (by pushing down upon the control C of S–1 so that terminals 2 and 6 and 4 and 8 are connected) and then proceeds to turn on the pre-heater circuit by closing switch PH found on the main panel, this in effect connects the terminal RA–A and RA–B so as to complete the circuit between lead 43 and lead 42. This puts the pre-heaters (labeled as such) with head heater HH directly across leads 40 and 53 of plug 11 in FIGURE 2. When it is desired to disconnect the preheaters from the circuit, switch PH is opened. At the same time manual ignition relay R–8 will be energized through S–1 so as to complete the battery (BAT) circuit to the ignition switch IS.

At this point the operator will depress one or more times the push button switch S–8 which is the accelerator button. This serves to introduce a certain amount of gas vapor into the engine manifold of the automobile to be started. Depression of switch S–8 connects terminals A and B thereof. Thus, the accelerator solenoid SL–1 in FIGURE 2A is placed directly across plug 10. (This circuit includes, starting from plug 10, leads 12 and 13, switch S–3 which is a master switch and now closed, lead 14, fuse F–1, leads 15, 16, and switch S–1; through lead 273, through accelerator switch S–8, through leads 274, 168, 170, and terminal 9 of terminal strip TS3 directly to the accelerator solenoid SL–1, and from thence through leads 298, 297, 296, 295 and 294 to terminal 16 of terminal strip TS–1 and from thence back to plug 10.) After the accelerator solenoid has been actuated two or three times the operator is now ready to depress start switch S–7 in FIGURE 2. Depression of this start switch starts the engine of the car. This circuit is as follows: from starter solenoid SL–3 and battery cable BC (both existing equipment to the hot side of the existing battery at lead 192; the ground side of the starter solenoid SL–3 including lead 179, through contacts A and B of relay R–7, through lead 180 to terminal 5 of TS–3 and from thence through lead 181, the terminal strip TS–4, up lead 183 and lead 184 to start button S–7 via lead 277, and from the start button S–7 through lead 278, through leads 185, 186 and 187 to terminal 1 of TS–1 and from there through lead 188, lead 189 and lead 190 and also lead 191 to ground at 326 in FIGURE 2A. Thus, the start switch S–7 simply serves to impress the battery ground of the circuit (i.e. that existing at the frame of the car) upon starter solenoid SL–3. Hence, start switch S–7 is merely in series between this ground and the starter solenoid of the car.

When the car is started by start button S–7, the operator then may accelerate the car by actuation of S–8 in a manner heretofore described.

The idling of the car will next be considered. Terminal G of motor M–3 is a ground return terminal. Terminals F and R are the forward and reverse lead terminals for the motor. The output (line 300) of motor M–3 is used for a carburetor adjustment. This mechanism may include simple spur gear 301 having an arm 302 which is linked at 303 to actuate the carburetor idling adjustment 304. MS–6 is a double pole single throw microswitch both sets of contacts of which are normally closed. Correspondingly, MS–5 is a single pole single throw switch and is normally closed. Thus, if motor M–3 were to travel too far in the forward direction so as to increase the idling speed excessively, MS–5 would open; correspondingly, if motor M–3 were to travel too far in the reverse direction so that idling were to be too slow, MS–6 would open.

It should be understood at this point that MS–3 is mounted within the automobile proper. If the automobile is idling at a normal rate of speed, then the operator need not be concerned with idling controls S–11 and S–12. Suppose now that the automobile is idling too slow and it is desirous to increase the idling speed. In this event the operator will depress the momentary contact switch S–11. This connects lead 252 with lead 250 and rheostat 249. (Rheostat 249 simply adjusts the rate of increase or decrease by regulating current flow through the motor M–3.) From rheostat 249 we go through lead 247 to terminals 4 of TS–1 and from there through lead 195, through terminals 4 of TS–4 to 193 of FIGURE 2A and from thence through terminals 4 of TS–3 to the hot side of the automobile battery. Returning to switch S–11 it is found that the remaining portion of the circuit is traced through lead 252 to terminals 10 of terminal strip TS–1 and from there through terminals 10 of TS–4 and TS–3 to lead 256 to terminal A of microswitch MS–5 which serves as a limit switch. It has been explained heretofore that this switch is normally closed and, in being so, the circuit is completed to terminal F of motor M–3. The remaining circuitry associated with the reduced speed idling control (switch S–12) may be traced from the automobile battery to terminal R of motor M–3. Again, the associated microswitch (this time MS–6) is normally closed and is inserted in series between the reduced speed idling control (switch S–12) and terminal R. Conceivably but one set of contacts need be employed in connection with MS–6. However, there are two sets of contacts used and one set is connected through contacts E and F of TDR–4; thus, when the system is on automatic and the driver is removing the plug of the system from the automobile, this second set of contacts MS–6 serves to connect the motor M–3 to the battery of the car (through lead 264 connected to terminal R) so that the motor will be operative to reduce the idling of the car to that point at which MS–6 will open.

The remaining two circuits to be considered on the manual side are the fan circuit and the choke circuit, if used. The exhaust fan will normally be mounted in the interior of the garage housing the vehicles. In manual operation the fan must be turned on by the operator simply closing switch FS (which shorts by L1 and L2 the leads 15 and 225) on the control panel so as to short across terminals C and D of the exhaust fan relay R–5.

With regard to the choke circuit (for use when the motor vehicle is not equipped with an automatic choke) the switch S–9 is provided and is a push button switch which, when depressed, disconnects the automatic side of the choke circuit and in turn shorts contacts C and D so as to place the choke solenoid SL–2 in FIGURE 2A directly across line voltage appearing at terminals 16 and 19 of TS–1 and leads 12 and 279 of plug 10.

It should be noted in passing that the tachometer "TACH" will be effective to indicate r.p.m. of the vehicle engine whether the system is on manual or on automatic.

If the system when on manual control is to be used in a multi-car operation, then the circuit of FIGURE 2D will be supplied (with the appropriate number of relays R–9 through R–17 and the appropriate number of control sub-panels CSP–1, CSP–2, and so forth). Then, relay SR–2 may be stepped by the selective, manual depression by switch S–14. This will step the system from one car to the next. To reset the system the reset button S–15 is depressed.

The automatic side of the system will now be discussed. It will be assumed that the system will be used to start two motor vehicles sequentially. For this operation selector switch S–1 will be set for automatic position (i.e. control C will be urged upwardly so that contacts 1 and 5 and contacts 3 and 7 are respectively shorted by arms X and Y of control C). Also, main switch S–3 will be closed and, since we have two cars involved, S–13 will be positioned on position B (the second position). The multi-car circuit DL is included in the system. Pre-heater switch S–5 is manually closed, fan switch S–4 will be closed, and, assuming that we need a choke control, switch S-6 will be closed. If it is assumed that two "cycles" of acceleration are required for each car (hereinafter explained) then selector switch S-2 will be set to position 2 as illustrated in FIGURE 2. The subpanels CSP-1 and CSP-2 associated with the main panels shown in FIGURE 2 will also have their respective choke, fan and pre-heater switches closed if it is assumed that all three operations are desired for the two vehicles connected to the cables W-1 and W-2 in FIGURE 2D.

The program timer 25 will be set to put the system into operation say 6:00 o'clock a.m. The time of course may be selected as desired by the user. Also, the program timer may be set so that the second car will be started say one hour later, i.e. 7:00 o'clock a.m. These times are arbitrary and may be selected by the operator as desired.

It is assumed that all of the abovementioned switches have been closed and that now the program timer 25 reaches the time 6:00 o'clock a.m. which operates to close contacts 20 and 24. Leads 18 and 282 are connected across the motor 22 and, by tracing the circuit, one sees that these leads are coupled to plug 10 of the system. When the contacts 20 and 24 come in contact at the predetermined time (e.g. 6:00 o'clock p.m.), current is supplied by a lead 19 through contacts 20 and 24, through lead 23 and terminals 4 and lead 26 to terminal A of time delay relay tube TDR-3. From this terminal A current is supplied, and will be seen by tracing the circuit, to motor M-4 and relays R-A, R-B and R-C in FIGURE 2B.

The operation of motor M-4 will first be considered. Microswitch MS-7 is normally closed and will remain closed for a predetermined period, say 45 minutes, until the cam C-7 associated therewith opens this circuit. MS-7 is in series with the pre-heater circuit of the system. It will be noted at the outset that RA is the pre-heater relay of the system and, since switch S-5 is closed, will be energized. This is because relay RB is energized and closes contacts E and F of this relay. Thus, the circuit is completed from terminal A of motor M-4, through contacts E and F of relay RB, back through switch S-5 to terminal D of relay RA. (It is seen that terminal A of motor M-4 is connected to terminal A of microswitch MS-7 which is in turn connected to the hot lead of the system.) Now, the closing of contacts B and A of relay RA, owing to the energization of relay RA by the closing of relay RB, will complete the pre-heater circuit which stems from leads 42 and 43 and respective terminals RA-B and RA-A, through the associated terminals in FIGURE 2, back through the FIGURE 2 circuit to leads 19 and 20 of plug 11. It will be seen that tracing this circuit through the input plug 11 will be directly connected to leads 48 and 58 of FIGURE 2A.

Motor M-4 may be designed to rotate one revolution per hour through an appropriate, gear reduction mechanism. At the same time that motor M-4 is energized it will be seen that, since power is supplied terminal A of relay TDR-3, tube TDR-3 will commence to heat. The contacts C of TDR-3 are normally closed and will remain so for a short period of time, say two seconds, at which time they will open. While time delay relay tube TDR-3 is warming up and the contacts C are closed, current will be supplied to stepping coil 65 so as to step arms 29 and 66 from position A (zero position) to position B (i.e., the car #1 position). Once this "step" is taken, the contacts C will open after a pre-determined time interval so as to remove current from the stepping coil 65. This prevents this coil from burning out or otherwise being affected by the current which would otherwise continue to flow therethrough.

After the 45 minutes is past and cam C-7 of motor M-4 reaches a position that microswitch MS-7 is opened, and current is removed from the pre-heater circuit (since MS-7 is in series with relay RB which energizes the pre-heater relay RA) so as to remove current from the pre-heater circuit which includes the pre-heaters (labeled as such) and head bolt HH illustrated in FIGURE 2A.

At some interval during the last 15 minutes of this one hour cycle, microswitch MS-8, which is normally open, will be closed by its cam C-8. Now cam C-8 is so designed that it will momentarily close microswitch MS-8 at the end of this first hour interval which will serve to energize reset coil 107 of stepping relay SR-2, provided that the circuit is completed through S-13 and gang B of stepping relay SR-2. (It will be noted now that position A of gang B of SR-2 is at zero position whereas positions B and C correspond to cars 1 and 2 in the system.) Since, by hypothesis, if a two-car system is employed, switch arm 104 will be set at position B of switch S-13; further, it will be noted that the reset coil circuit 107 will be completed only when arm 66 has been set to position C. However, since in the present instance only the first car is being started, arm 66 will be at position B so that there will be no completion of the circuit through reset coil 107. The reset coil circuit will now be traced starting from neutral lead 282 in FIGURE 2A and leading from there through terminals 3, lead 303 to terminal B of TDR-3 and from there through lead 304 and lead 305 to reset coil 107, and from terminal A thereof through lead 106; the hot side of the circuit through MS-8 and lead 105, through switch S-13 and gang B of SR-2, through lead 28 and jumper 27 to the hot terminal A at tube TDR-3.

It will be noted at this point the arm 29 of gang A of switch SR-2 will be at position B so as to energize relay R-9 and pilot light P-11 as shown in FIGURE 2B and also FIGURE 2D. This closes the several contacts from the left hand side of FIGURE 2D as associated with relay R-9, thereby completing terminals 1-18 of the terminal strip TS-4 (which may be considered as equivalent to a junction box) to the cable W-1, directed toward its respective automobile via respective plugs PL-1 and PL-2 in FIGURES 2A and 2C. (It will be noted that, since it is assumed desired to operate the choke, fan and pre-heater circuits, the choke, fan and PH switches of subpanel CSP-1 and subpanel CSP-2 will be closed.)

It has been heretofore explained that after this first 45 minute interval, relay RB will become de-energized, thereby opening contacts E and F and also closing contacts D and C thereof. This operation energizes relay RC so as to close the contacts across terminals A and B and terminals C and D of relay RC. The energization of relay RC supplies current to time delay relay TDR-4 in FIGURE 2A, to terminals 5 and 7 of switch S-1, sends current to relay R-6, to choke control, time delay relay TDR-2, and to hot terminal bus TB-1 through switch S-1. Likewise, exhaust fan relay R-5 is similarly energized through switch S-4. Thus, the closing of relay RC supplies current to leads 108, 113 and 118 in FIGURE 2B. Lead 108, as will be seen in FIGURE 2, is connected to terminals 5 and 7 of switch S-1. Lead 113 may be traced to terminal G of time delay relay TDR-4. Lead 118 may be traced to ignition relay R-6 and through switch S-6 to terminal C of time delay relay TDR-2. Likewise, current is supplied from terminal A of relay R-6 to the exhaust fan relay R-5. Also, since switch S-1 is set to automatic position, current from terminal 5 shunts across this switch to terminal 1 thereof and from lead 110 is sent to terminal bus TB-1 which is the hot bus. Finally, lead 111 comes from terminal 1 of switch S-1 and, being hot, routes current through switch S-9, through the normally closed contacts (A and B) thereof, to terminal A of choke control time delay relay TDR-2.

It will be recalled that terminal D of the transformer T-1 is a constantly hot terminal. Lead 123 routes from terminal D of transformer T-1 and is connected directly to terminal A of microswitch MS-4. From terminal A we proceed from one side of microswitch MS-4 through lead 124 to arms 125A, 125B, 125C and 125D and 125E of the five-gang stepping relay SR-1 in FIGURE 2. All of the contact arms 125A through 125B will be set on position 1 initially. These are the normal "rest" contacts. Current will thus be fed through contact arm 125A to lead 126 which is connected to contact 1 of gang A and from there through contact arm 127, through contact 2, through contact 2 of gang 1 and lead 146, through lead 136 and terminal bus TB–3, through lead 141 to time delay relay TDR–1, and back from TDR–1 to the neutral bus TB–2 via lead 190. Thus, TDR–1 is energized after a predetermined time interval so as to close contacts A and B of TDR–1 and open contacts C and D thereof. Since relay RC is energized, current will be flowing from this circuit, which includes terminals 1 and 5 of switch S–1, and through lead 110 to TB–1 which is now hot and from there proceeds through contacts A and B of TDR–1 to terminal A of motor M–1. Since terminal B of M–1 is maintained at ground potential through terminal bus TB–2, this motor starts to rotate. Motor M–1 may be designed, for example, to the rate of one revolution per minute. As motor M–1 is turning, cam CA–1 actuates the acceleration solenoid through microswitch MS–1. This circuit is as follows: the hot side of the circuit proceeds from terminal bus TB–1, through lead 161, through lead 166 and microswitch MS–1, through lead 167 and terminal 9 of TS–1, and eventually through terminal 9 of TS–3 to the accelerator solenoid SL–1, with the neutral side at terminal B of the accelerator solenoid SL–1 being completed through terminal 16 of TS–3 and terminal 16 of TS–1. Cam CA–1 may have several places on its periphery causing closing of microswitch MS–1 so that, for one discrete cycle of motor M–1 the accelerator solenoid may be energized one, two, three or more times. It should be kept in mind, however, that the position of selector switch S–2 will determine the number of revolutions (i.e. "cycles") of motor M–1 and hence the total number (summation) of acceleration cycles during a particular operating sequence. In a physical sense, after the cam "rises" of CA–1 associated with cam motor M–1 there will be a cam "rise" on cam CA–2 for the purpose of closing MS–2. Closing of MS–2 completes the circuit to the starter relay R–4 which includes (from the reverse direction) lead 178 connecting to terminal B of MS–2, through MS–2 to lead 112 and terminal 3 of S–1 which is connected to the hot terminal 5 by jumper wire 109. This circuit merely completes the circuit to ground of starter solenoid SL–3. This ground circuit consists of lead 179 in FIGURE 2A, contacts A and B of relay R–7 and lead 180 to terminal 5 of TS–3, via terminal 5 of TS–1 to terminal C of relay R–4. From terminal C connection may be established through terminal D of relay R–4 through 185 leads 186 and 187 to terminal 1 of TS–1 and from terminal 1 to ground 326 of the automobile battery. Thus, the starter solenoid circuit merely is completed to ground by the actuation of microswitch MS–2. The positive side of the solenoid is directly connected, as may be traced, to the positive side of the automobile battery at 192.

At this point the engine has started. (Digressing a moment, it will be observed that there are two ignition relays, R–6 and R–8. R–6 is for the automatic side of the system whereas R–8 is for the manual side. R–6 is energized so as to close the ignition circuit through lead 118 when relay RC is energized.) The cams will be so arranged that after the starting is completed as provided for by the actuation of microswitch MS–2 the cam CA–1 will begin a new acceleration.

A positioning of selector switch S–2 will determine the number of cycles that motor M–1 will make. Since the selector switch is shown in position 2, it will follow that the motor M–1 will make two revolutions.

When one revolution (or within a degree or two of same) has been made by motor M–1, cam CA–3 by virtue of its design will actuate microswitch MS–3 so as to close contacts A and B thereof which in turn completes the circuit of the stepping coil 230 to the hot terminal bus TB–1 at terminal A of microswitch MS–4. This causes the five-gang stepping relay SR–1 to step from position 1 to position 2. Now selector switch S–2 is set for position 2 so that after the second "cycle" of acceleration points as provided with M–1, stepping coil 320 will again step one so as to place the arms 125A–125E on position 3.

At this point it is understood that when the five gangs of contact arms 125A–125E are on the next position (which is position 3) the current will be interrupted through selector switch S–2 since there is no contact between arm 138 and contact 3 of gang 3 of this switch. This interrupts current flow through TB–3 so as to de-energize the relay TDR–1. After the slight delay (2 or 3 seconds) the motor M–1 will shut off. The purpose for the delay of TDR–1 is to permit the motor M–1 and its shaft to position itself appropriately so that, when again used for the second car, the system will start in proper sequence, e.g. acceleration will be possible prior to starting of the car.

At this point it is noted that the contact arms 125A–125E are still at position 3. Thus, current is flowing through the contact arm 125D back from terminal 3 thereof through leads 232, 233, 234 and 235, through contacts C and D and lead 236 to terminal A of motor M–2. The neutral of terminal B of M–2 is completed back to terminal bus TB–2 via lead 293. Accordingly, the motor M–2 turns cam CA–4 so as to close microswitch MS–4 which in turn energizes the reset coil 238 via lead 237 and lead 291 to the neutral bus TB–2. Accordingly, the stepping relay SR–1 is set back to position 1. The stepping back removes the contact arm 125D from position 3 and in turn stops the motor M–2.

It will be recalled that the exhaust fan relay R–5 has been energized so as to supply current to the exhaust fan (see FIGURE 2) which is mounted in the garage to remove carbon monoxide from the area therefrom. The exhaust fan circuit is as follows. The power derived from TB–1 is conducted through lead 222 of fuse F–4 and lead 223 to terminal D of the exhaust fan relay R–5, and from there through terminal C of this relay, through lead 225 to terminal 15 of TS–1, TS–4 and from there to the exhaust fan. A ground return is supplied via lead 300 to terminal 16 of TS–4 and TS–1.

With respect to the choke control relay TDR–2, the contacts A and B are normally closed and power is supplied terminal A as soon as relay RC has energized (hereinbefore mentioned). This relay will open at approximately 90 seconds so as to interrupt the circuit to the choke solenoid SL–2 in FIGURE 2A. This circuit includes lead 177 in FIGURE 2A to terminal 8 of terminal strips TS–3, TS–4, through the circuit of FIGURE 2D to TS–4, through the choke switch of subpanel CSP–1 and from there from terminal 8 of TS–4, through terminal A of TS–1, through leads 173 and 172 to terminal B. Terminal A of TDR–2 is connected through 111A and switch S–9 (which is normally closed), through lead 111 to terminal 1 of switch S–1 and to terminal 5 of switch S–1 which is hot. Thus, it is seen that this circuit is interrupted by switch S–9. It should be mentioned in passing that the choke control relay TDR–2 will remain heated until the program timer 25 disconnected power from the system. (It should be recalled that the choke control circuit will only be used where the automobile is not itself supplied with an automatic choke.)

As described in the manual operation of the system, the tachometer and the fast and slow idling controls S–11 and S12 are still operative; however, these latter controls will have to be operated manually if there should be an idling adjustment required.

If for any reason it is desired to set the stepping relay SR–1 back to positioning 1, this can be accomplished by the manual depression reset button S–10. Switch S–10 merely shunts the reset coil 238 across power of plug 10. This may be desirous when several (motor) cycles of acceleration have been set for by the panel and yet it is desired to vary the number of cycles for one reason or another. Reset button S-10 may be desirable in many situations, particularly where there may likely be a failure of reset coil 238 or of motor M-2; the reset button 10 may be deleted if considered desirable.

The program timer 25 is designed so that when contacts 20 and 24 do make contact they will remain in this condition for a period of time, say one hour. At this time the contacts will open and the system will be completely dormant.

Suppose now that the program timer is set for the second car to be energized at 7:00 o'clock a.m. or perhaps a minute or two afterwards. In this event the contacts 20 and 24 will close at the appointed time and stepping coil 65 will be energized to step arms 29 and 66 of gangs A and B of SR-2 to position C, and the same automatic operation will transpire, but this time relay R-10 of FIGURE 2B and FIGURE 2D can energize so as to close the appropriate set of contacts leading to the cable associated with the second automobile. The steps hereinbefore described will then be taken by the system. Again, switch S-13 is set for the number of cars that are to be operated. Accordingly, arm 104 will set at position B where we have two cars in operation. Arms 29 and 66 will be at position C when the program timer reaches the 7:00 o'clock a.m. (or shortly after), the present time for the second car. This completes the circuit through gang B of SR-2 and through switch S-13 to microswitch MS-8 so that the cam C-8 will operate to close MS-8 and to complete the circuit through lead 106 to reset coil 107 to actuate this reset coil which, in turn, will return the switch arms 29 and 26 back to position A. Thus, after the program timer contacts 20 and 24 have remained closed for this second starting, the system will be completely dormant.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. An internal combustion engine including starting and acceleration controls; and in combination therewith, apparatus for automatically starting and warming up said engine, said apparatus comprising electrical circuit means including switch and cam motor means coupled to said controls for remotely actuating said controls in a desired sequence, said electrical circuit means also including means, including manually operable selector switch means, for selecting a desired number of acceleration cycles through which said engine is to be put, and means for supplying electrical power to said electrical circuit means at selected times, and wherein said selecting means comprises means, including manually operable selector switch means, for selecting the number of acceleration, pumping cycles through which said engine shall be put, both before and after starting thereof.

2. A multiplicity of internal combustion engines each including starting and acceleration controls; and in combination therewith, apparatus for automatically starting sequentially said engines by remote control, said apparatus comprising electrical circuit means including switch means and cam motor means coupled to said controls for remotely actuating sequentially said controls of said engines sequentially, and single program timer means for supplying electrical power to said electrical circuit means at selected times.

References Cited in the file of this patent
UNITED STATES PATENTS

| | | |
|---|---|---|
| 1,269,637 | Olmsted | June 18, 1918 |
| 2,251,630 | Loeffler et al. | Aug. 5, 1941 |
| 2,569,332 | Perkins | Sept. 25, 1951 |
| 2,592,945 | Odell | Apr. 15, 1952 |
| 2,707,463 | Booth | May 3, 1955 |
| 2,739,247 | Pope | Mar. 20, 1956 |
| 2,748,759 | Schiffer | June 5, 1956 |
| 2,791,699 | Taylor | May 7, 1957 |
| 2,873,382 | Herring | Feb. 10, 1959 |
| 2,934,055 | Kennedy | Apr. 26, 1960 |
| 2,936,348 | Adcox | May 10, 1960 |